United States Patent [19]
Lin et al.

[11] Patent Number: 6,049,149
[45] Date of Patent: Apr. 11, 2000

[54] BRUSHLESS DC MOTOR HAVING OPPOSED PAIRS OF AXIAL MAGNETIC FIELD TYPE PERMANENT MAGNETS AND CONTROL SYSTEM THEREFOR

[76] Inventors: Shou-Mei Lin, No. 7, Alley 6, Lane 141, Fu-Hsing N. Rd., Taipei; Yu-Yen Wang, No. 56-19, Lane 269, Lin-Sen E. Rd., Chiayi, both of Taiwan

[21] Appl. No.: 09/274,349

[22] Filed: Mar. 23, 1999

[51] Int. Cl.⁷ ...................................................... H02K 11/00
[52] U.S. Cl. .......................... 310/68 R; 310/268; 318/773
[58] Field of Search .................................. 310/68 R, 112, 310/156, 268; 318/771, 773

[56] References Cited

U.S. PATENT DOCUMENTS

| | | | |
|---|---|---|---|
| 3,931,553 | 1/1976 | Stich et al. | 318/138 |
| 4,354,145 | 10/1982 | Janssen | 318/254 |
| 4,633,149 | 12/1986 | Welterlin | 318/254 |
| 5,216,339 | 6/1993 | Skybyk | 318/254 |
| 5,245,238 | 9/1993 | Lynch et al. | 310/116 |
| 5,334,898 | 8/1994 | Skybyk | 310/268 |
| 5,394,321 | 2/1995 | McCleer et al. | 363/131 |
| 5,448,141 | 9/1995 | Kelley et al. | 318/254 |
| 5,614,799 | 3/1997 | Anderson et al. | 318/439 |

*Primary Examiner*—Nestor Ramirez
*Assistant Examiner*—Joseph Waks
*Attorney, Agent, or Firm*—Bacon & Thomas

[57] ABSTRACT

A brushless DC motor includes opposed pairs of axial magnetic field type permanent-magnets. Two opposed stators are axially arranged at two opposite sides of a rotor, each and stator includes a plurality of equiangularly spaced electromagnetic zones and in least one winding at each electromagnetic zone. A control system is provided to detect phase angle and the revolving speed of the rotor through a sensor and to control the connection of DC current to each winding and its direction, enabling the windings in the electromagnetic zones to form with the rotor at least one motor. By means of detecting speed change of the rotor through the sensor, the control system controls the opposed pairs of axial magnetic field type permanent-magnet brushless DC motor to operate under different motor operation combinations and to output different torques.

4 Claims, 7 Drawing Sheets

BRUSHLESS DC MOTOR HAVING OPPOSED PAIRS OF AXIAL MAGNETIC FIELD TYPE PERMANENT MAGNETS AND CONTROL SYSTEM THEREFOR

BACKGROUND OF THE INVENTION

The present invention relates to a permanent-magnet brushless DC motor, and more particularly to a brushless DC motor having opposed pairs of axial magnetic field type permanent-magnets which achieves low and medium revolving speed, high torsional force and high power.

Regular electric motors are commonly of "radial magnetic field" type. Because the rotor of this design of electric motors receives pushing force from one side only, the number of poles and space utilization percent of these conventional electric motors are low. There is known another type of electric motor using an "axial magnetic field". However, these electric motors are AC single phase, two-phase or three-phase synchronizing/synchronizing induction motors, permanent-magnet step motors, magnetic resistance motors rather than DC motors or permanent-magnet synchronizing motors.

Due to improvement in steel material magnetization, and availability and cost reduction of rubidium borax rare earth magnetic metal, permanent-magnet DC motors have been intensively used in different fields. Because high intensity magnetic materials are intensively used, permanent-magnet DC motors are relatively smaller, thinner and lighter than equivalent AC motors, and save more energy than equivalent AC motors. In certain application fields, the performance curve of permanent-magnet DC motors is superior to that of AC motors. Furthermore, fast development of the semiconductor industry in recent years has greatly improved the application of permanent-magnet brushless DC motors in electronic, digital servo control fields. However, no brushless DC motors having opposed pairs of axial magnetic field type permanent-magnets have previously been proposed.

SUMMARY OF THE INVENTION

It is one object of the present invention to provide a brushless DC motor having opposed pairs of axial field type permanent-magnets motor which provides one or more than one torque output curve. It is another object of the present invention to provide a brushless DC motor having opposed pairs of axial field type permanent-magnets motor which increases the space utilization percentage and torque output by doubling the number of poles. It is still another object of the present invention to provide a brushless DC motor having opposed pairs of axial field type permanent-magnets motor which uses one rotor with two opposed electromagnetic stators, enabling the rotor to receive a stable push force from two opposite sides.

According to the present invention, the brushless DC motor having opposed pairs of axial field type permanent-magnets motor comprises a rotor, two stators, and a control system. The rotor comprises a plurality of equiangularly spaced permanent magnets each of said magnets having poles arranged in an axial direction parallel to said axis, respective poles of, each two adjacent permanent magnets having opposite axially-oriented polarities reversed directions. The stators are axially arranged at two opposite sides of the rotor. Each stator comprises a plurality of equiangularly spaced electromagnetic zones facing the rotor, each electromagnetic zone comprising at least one winding. The control system comprises at least one sensor to detect the phase angle and revolving speed of the rotor. The control system controls the selective connection and disconnection of said windings to and from a source of DC current and a direction of the DC current supplied to each of the windings in the electromagnetic zones, enabling the windings at the electromagnetic zones to form with the rotor at least one motor M1, M2, . . . By detecting speed change of the rotor through a sensor, the control system controls the brushless DC motor to provide different motor operation combinations and to output different torques. The control system can be a DC phase-change control system, AC to DC phase-change control system, or manual control system, or any equivalent control system. Preferably, an electronic phase-changing control system with three-phase 6-wire bridge is used, i.e., the motor works subject to the principle of electronic shift control. The sensor can be a Hall sensor, or any equivalent element capable of detecting the phase angle and polarity position. Preferably, a Hall IC type sensor is used.

The resulting motors can be arranged as unequal motors (M1≠M2≠ . . . ), or equal motors (M1=M2= . . . ). The windings at each electromagnetic zone are wound on an iron core, preferably a tape-wound iron core. More than one rotor can be used with a respective pair of opposed stators for forming multiple motor combinations, so as to provide more multiple torque changes.

The permanent magnets at the rotor are equiangularly fastened to the rotor by insertion, bonding, press-fitting, or any of a variety of mounting measures. Preferably, the permanent magnets are made by: putting steel elements in a mold, then injecting or pressing aluminum alloy, engineering plastics, MBC, DMC, or any other non magnetic conductive thermosetting plastics into the mold, enabling the steel elements to be respectively covered with a layer of non magnetic conductive material, surface-treating the material-covered steel elements, and then magnetizing the surface-treated, material-covered steel elements into the finished products.

BRIEF DESCRIPTION OF THE DRAWINGS

FIGS. from 3 through 5 illustrate the arrangement of the three-phase windings according to the present invention.

FIGS. from 7 through 12 are sectional views showing the continuous action of the bi-motor operation mode according to the present invention.

DETAILED DESCRIPTION OF THE PREFERRED EMBODIMENT

The present invention is particularly suitable for making a low or medium revolving speed, high torque, high power, permanent-magnet brushless DC motor.

Figure 1:
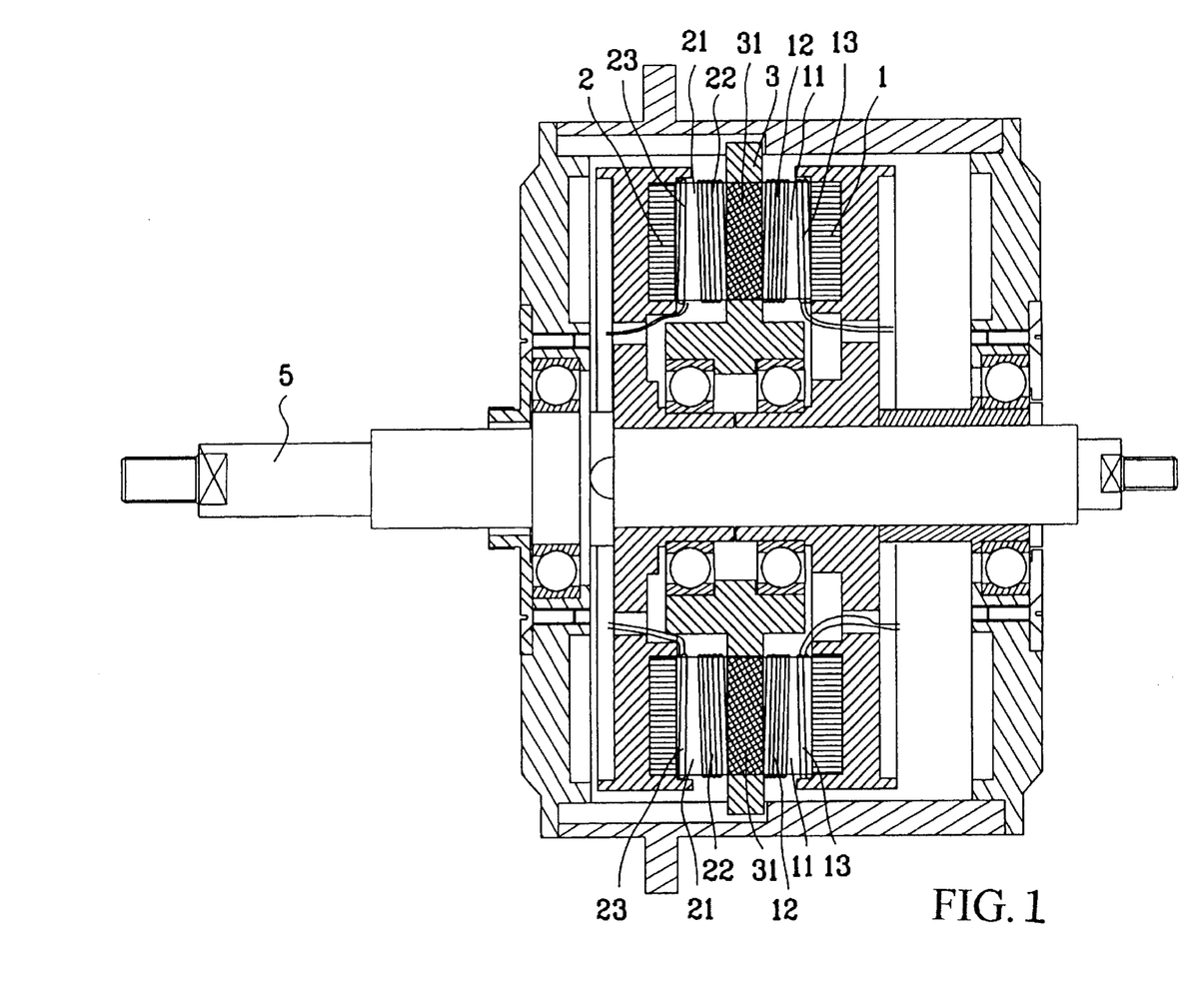
FIG. 1 is a sectional view of the brushless DC motor having opposed pairs of axial magnetic field type permanent-magnet according to the present invention.
Figure 2:
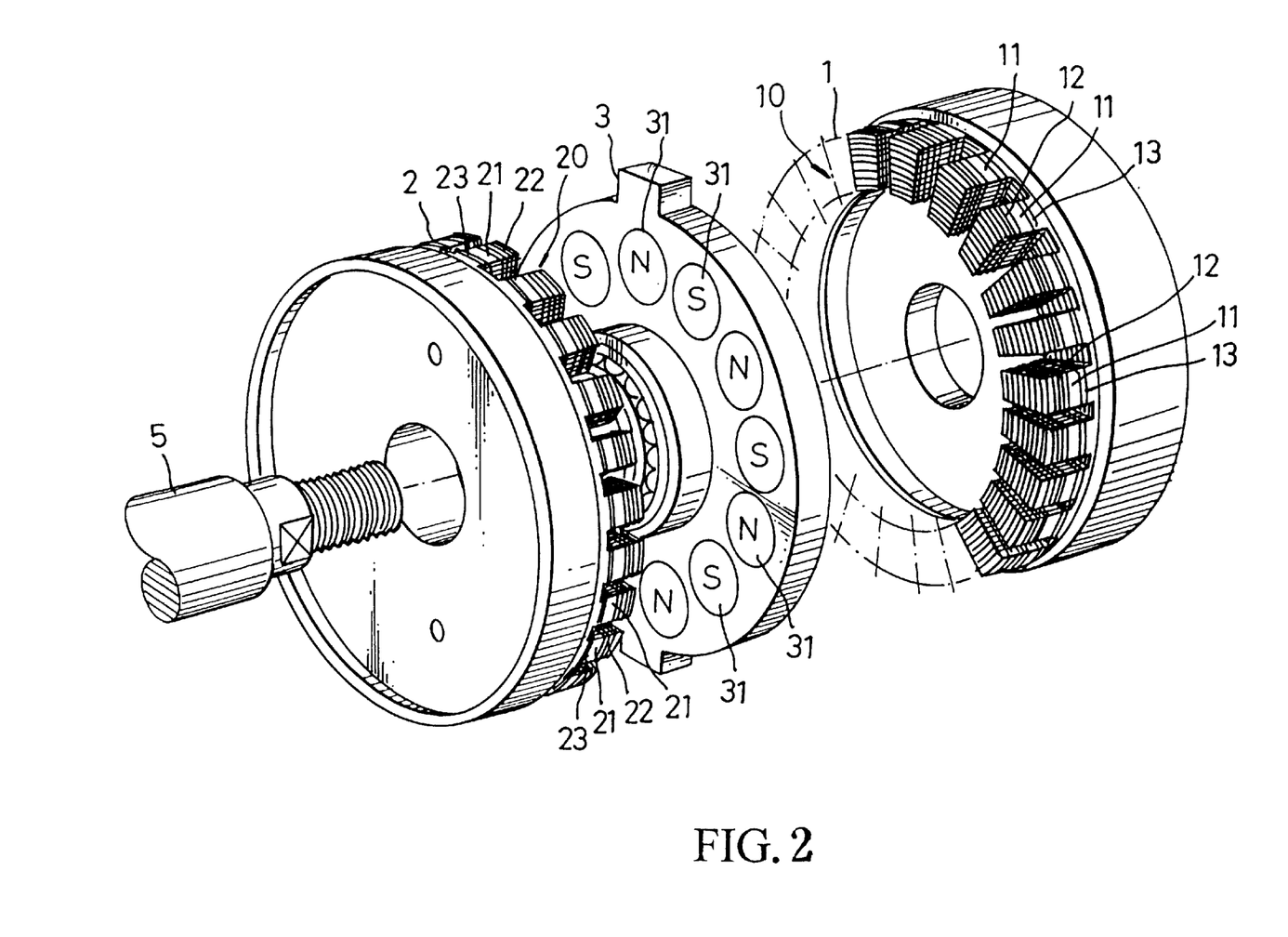
FIG. 2 is a perspective exploded view of the DC motor shown in FIG. 1.

Referring to FIGS. 1 and 2, a three-phase two-pole permanent-magnet brushless DC motor is shown comprised of a shaft 5, a rotor 3 mounted on the shaft 5, and two opposed stators 1 and 2 respectively facing the rotor 3 at two opposite sides. The rotor 3 comprises 16 permanent magnets 31 equiangularly spaced around its center. Each two adjacent permanent magnets 31 have their polarity axially arranged in reversed directions. The permanent magnets 31 of the rotor 3 are made by putting steel elements in a mold, then injecting or pressing aluminum alloy, engineering plastics, MBC, DMC, or any other non magnetic conductive thermosetting plastics into the mold, enabling the steel elements to be respectively covered with a layer of non magnetic conductive material, surface-treating the material-covered steel elements, and then magnetizing the surface-treated, material-covered steel elements into the finished products. The stators 1 and 2 are axially arranged at two opposite sides of the rotor 3, each having an inner side 10 or 20 and 24 electromagnetic zones 11 or 21 equiangularly spaced at the inner side 10 or 20. Each of the electromagnetic zones 11 or 21 is comprised of two windings 12; 13 or 22; 23 at inner and outer sides of a respective tape-wound iron core.

Figure 3:
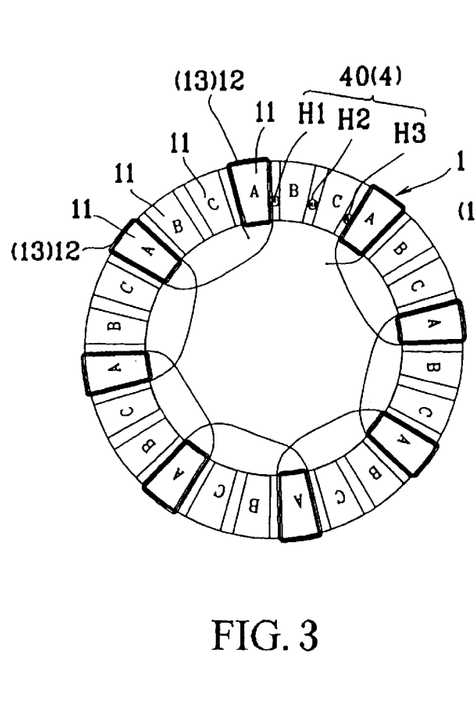
Figure 4:
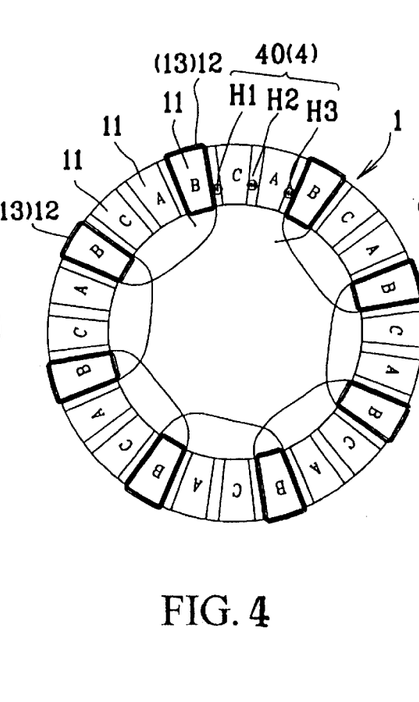
Figure 5:
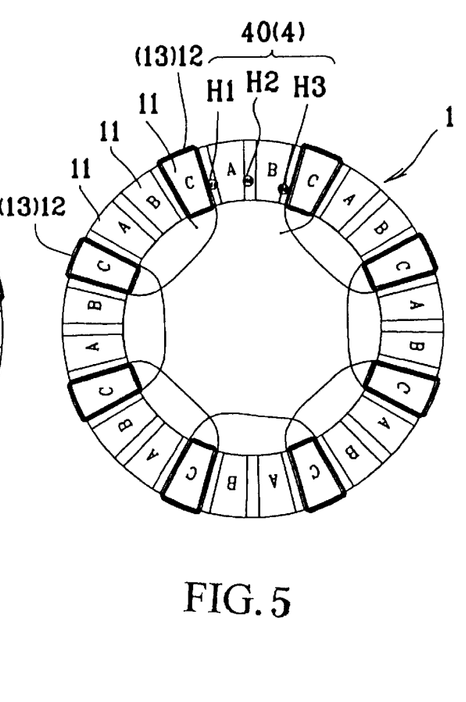

FIGS. 3 through 5 illustrate the arrangement of three-phase windings according to the present invention. The 24 electromagnetic zones 11 of the stator 1 are arranged into three groups A, B and C alternatively arranged together. The first windings 12 of same electromagnetic zone group A (or B or C) are wound on the respective tape-wound iron cores at an inner side and then connected together to thereby from concentrated windings as defined in IEEE standard Dictionary of Electrical and Electronics Terms. The second windings 13 of the same electromagnetic zone group A (or B or C) are wound on the respective tape-wound iron cores at an outer side and then connected together to also form concentrated windings. The windings 22 and 23 at the stator 2 are arranged in the same manner.

Figure 6:
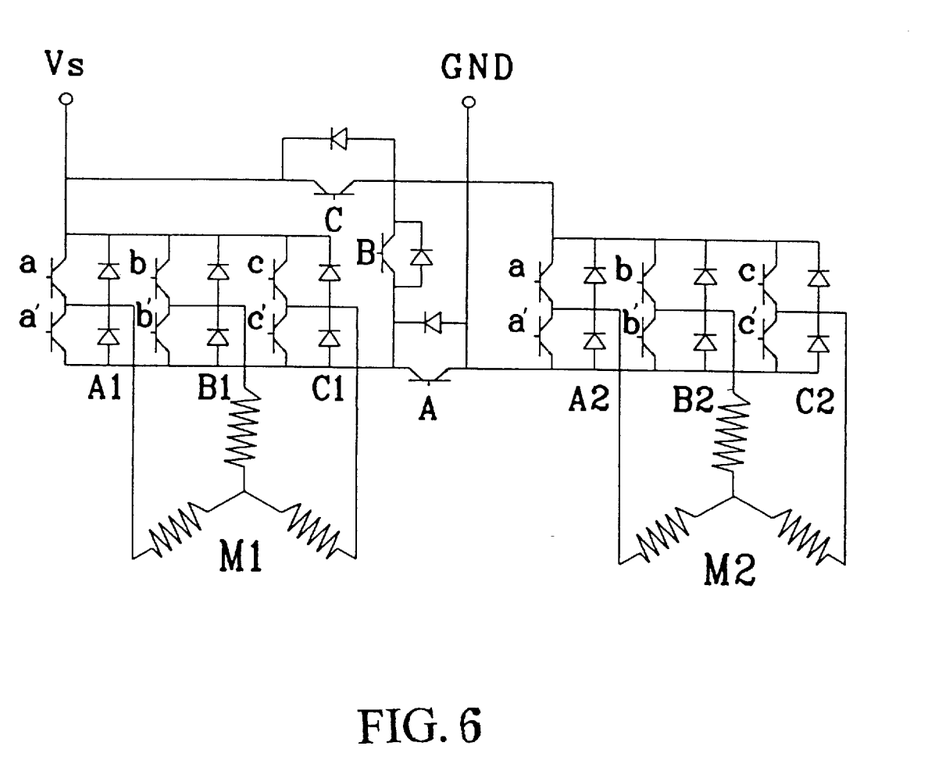
FIG. 6 illustrates the bridge structure of an electronic phase-changing DC three-phase 6-wire bridge control system according to the present invention.
Figures 7, 8:
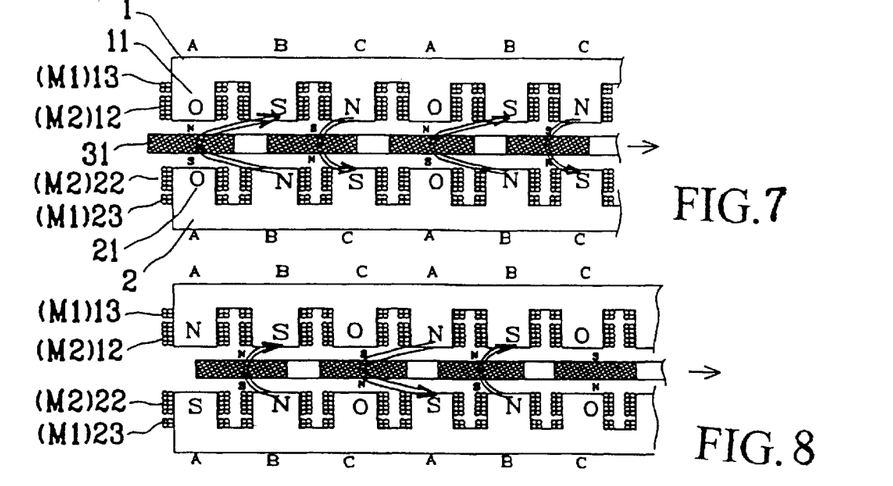
Figure 9:
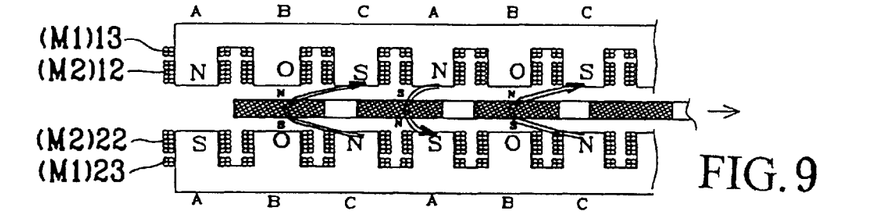
Figure 10:
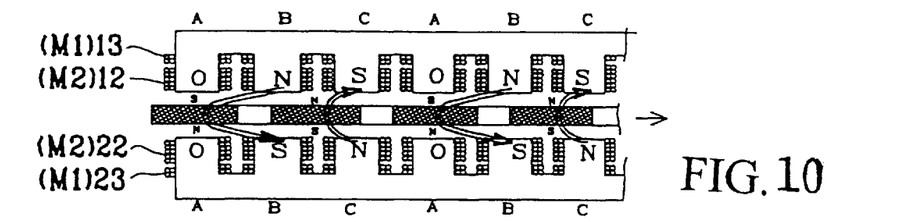
Figure 11:
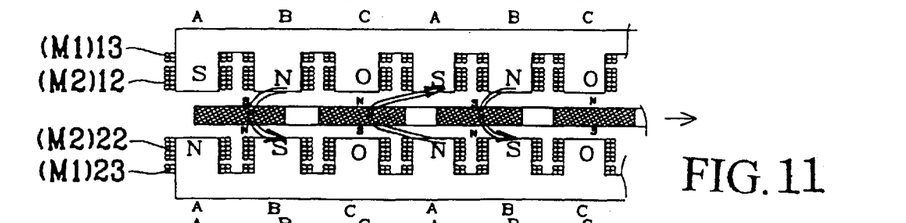
Figure 12:
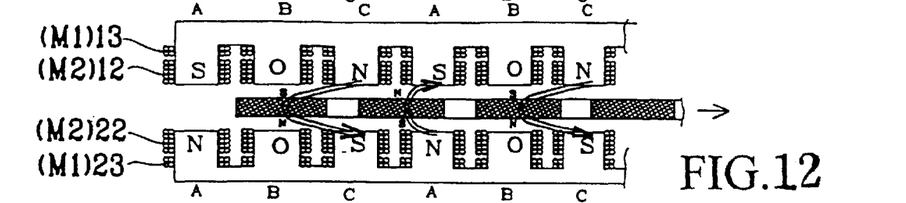

The aforesaid three-phase two-pole permanent-magnet brushless DC motor is used with an electronic phase-changing DC three-phase 6-wire bridge control system 4. FIG. 6 shows the bridge structure of the bridge control system 4 and its field power switch shifting between M1, M2 and M1+M2. The sensor 40, see FIGS. from 3 through 5, is comprised of three Hall ICs (HI, H2 and H3), and used to detect the phase angle and revolving speed of the rotor 3.

Upon detection of the phase angle and change of revolving speed of the rotor 3 through the Hall ICs (Hi, H2 and H3), the electronic phase-changing DC three-phase 6-wire bridge control system 4 connects DC current to the windings 12 and 13 at the same electromagnetic zone 11 (or 21) in the same direction (or to earth), and also connects DC current to the windings 12 and 13 at each different three adjacent electromagnetic zones 11 in different directions (or to earth), enabling every three adjacent electromagnetic zones 11 (or 21) to provide 6 axial magnetic field combinations (shown in FIGS. 7 through 12). Control system 4 also controls the stators 1 and 2, enabling the electromagnetic zones 11 and 21 at different stators 1 and 2 to have reversed axial magnetic fields or be connected simultaneously to earth to have zero magnetic field. Accordingly, the directions of the reversed axial magnetic fields are alternatively changed in sequence. Therefore, the windings 12 and 22 of the relative electromagnetic zones 11 and 21 at the stators 1 and 2 form effectively with the rotor 3 an electric motor M2, and the windings 13 and 23 form with the rotor 3 another electric motor M1.

Figure 15:
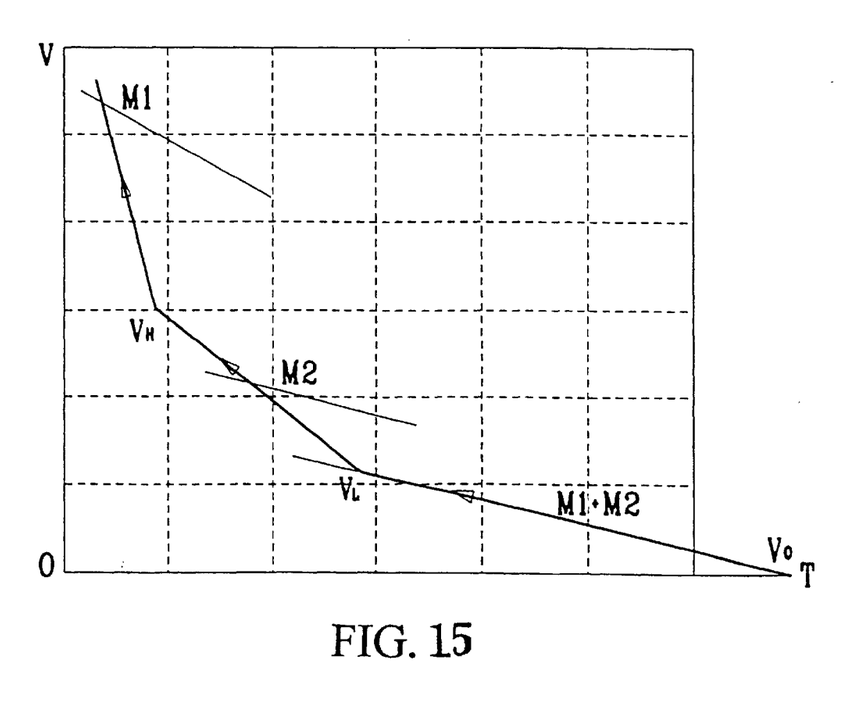
FIG. 15 is a velocity-torque curve according to the present invention.

When the motor vehicle starts from zero speed $V_0$, it requires a high torsional force (as shown in FIGS. 15). When the Hall ICs (H1, H2 and H3) detects a low revolving speed of the rotor 3, the electronic phase-changing DC three-phase 6-wire bridge control system 4 connects DC current in different phases to the windings 12, 13, 22, 23 at different electromagnetic zones 11, 21 of stators 1, 2 at the same time, and then changes the phases in a predetermined manner, i.e., the electric motor works electronically, enabling both electric motor M2 and electric motor M1 to simultaneously apply force to the rotor 3, thereby it providing an additive output M1+M2. FIGS. 7 through 12 are sectional views of continuous action of the rotor 3 alternatively driven by the repulsion force from the windings 12, 13; 22, 23, explaining why the rotor 3 is continuously pushed forwards, achieving a bi-motor operation mode.

Figure 13:
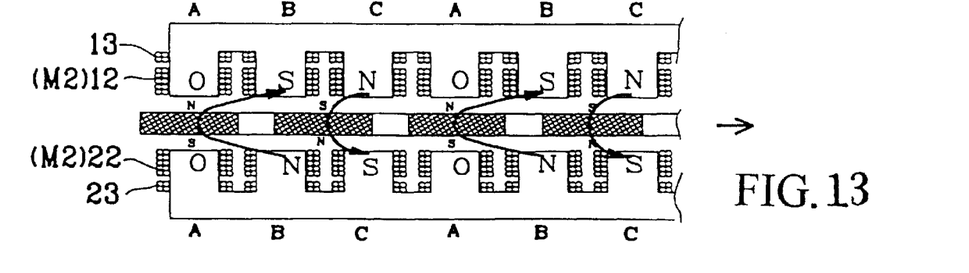
FIG. 13 illustrates the operation of one single-motor M2 according to the present invention.

When the revolving speed of the rotor 3 is gradually increased after starting and a low revolving speed $V_L$ of the rotor 3 is detected by the Hall ICs (H1, H2 and H3), the control system 4 only connects DC current of different phase to the windings 12 and 22 to earth. FIG. 13 illustrates only one single motor M2 operation mode.

Figure 14:
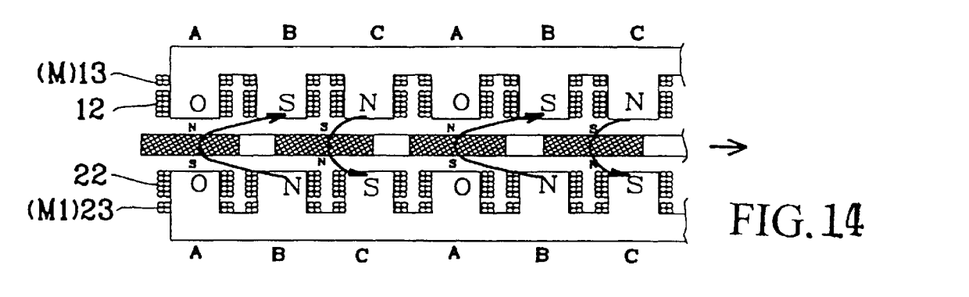
FIG. 14 illustrates the operation of the other single-motor M1 according to the present invention.

When the revolving speed of the rotor 3 is increased to a high revolving speed $V_H$, the control system 4 alternatively connects DC current of different phase to the windings 13 and 23 or to earth only. FIG. 14 illustrates another single motor M2 operation mode.

FIG. 15 shows a V(velocity)-T(torque) curve according to the present invention. The present embodiment controls transition of electric current at different revolving speeds to achieve a bi-motor M1+M2 operation mode or a single motor M2 or M1 operation mode, forming three torque curve combinations. Therefore, the invention achieves the effect of electronic phase changing and electronic gear shifting of a speed-change motor vehicle.

Because two opposed stators are provided at two opposite sides of a rotor, the number of poles is relatively doubled, space utilization percentage is increased, and a high output torque superior to a radial magnetic field motor of similar size can be provided. Because magnetic push force is applied to the rotor evenly from two opposite sides, the rotation of the rotor is stable.

Figure 16:
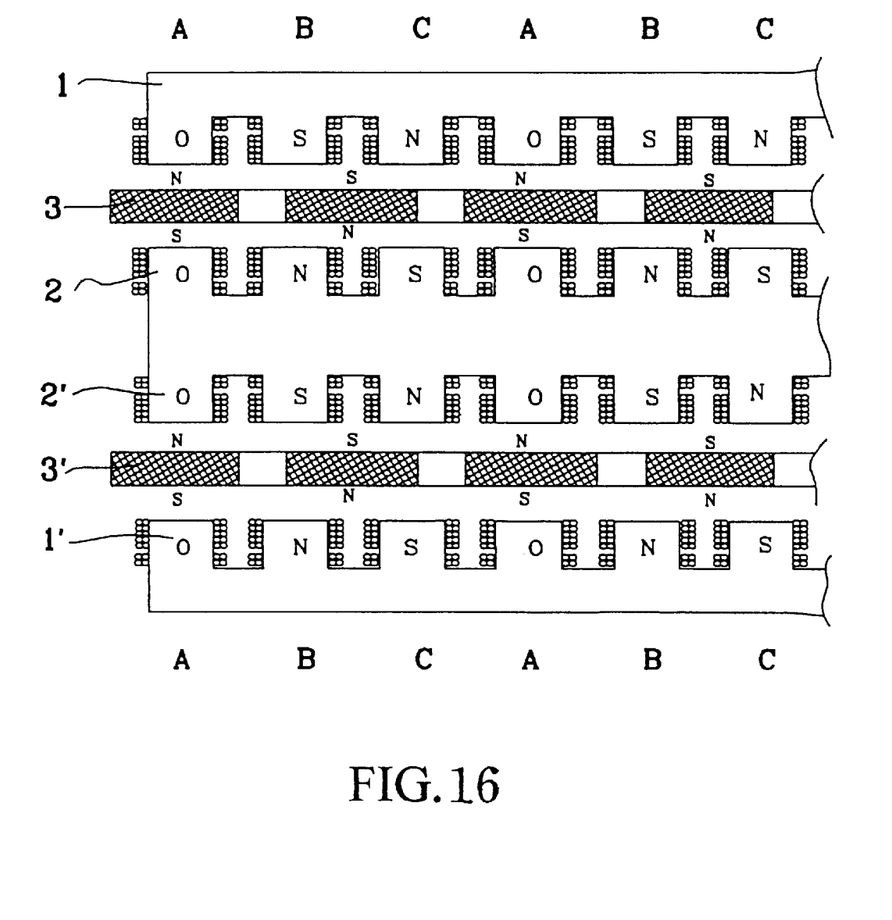
FIG. 16 illustrates an alternate form of the present invention.

FIG. 16 shows an alternate form of the present invention. This alternate form comprises two rotors 3 and 3', and two sets of opposed stators 1; 2 and 1'; 2' are respectively provided at two opposite sides of each of the rotors 3 and 3'. Therefore, this arrangement forms four motors M1, M2, M3 and M4, that can be separately used, or combined with one another to form one of a series of combinations. As illustrated, two adjacent stators 2 and 2' are formed integrally with each other to save space and cost. The stators 2 and 2' can be separately arranged if desired.

It is to be understood that the drawings are designed for purposes of illustration only, and are not intended for use as a definition of the limits and scope of the invention disclosed.

What the invention claimed is:

1. A brushless DC motor comprising:
    a rotor having an axis and a plurality of permanent magnets equiangularly spaced around a center of the rotor, each of said magnets having poles arranged in an axial direction parallel to said axis, respective poles of each adjacent two of said permanent magnets having a reversed polarity;
    two opposed stators disposed on two opposite sides of said rotor in said axial direction, said stators each comprising a plurality of equiangularly spaced electromagnetic zones respectively facing said rotor, said electromagnetic zones each comprising an iron core supporting one concentrated winding; and a control system arranged to selectively connect and disconnect each of the windings to a source of DC current and to control a direction of the DC current supplied to each of the windings in the electromagnetic zones, said selective connection and disconnection of the windings, and said direction of DC current in said each of the windings, determining at least one property of motor, said control system comprising at least one sensor to detect a phase angle and revolving speed of said rotor;

wherein said control system controls the selective connection or disconnection, and the direction of a DC current supplied to different combinations of said concentrated windings based on detection of speed changes or of said rotor through said sensor to cause said brushless DC motor to have different properties and to output different torques.

2. The brushless DC motor of claim 1, wherein said control system is a DC control system with a three-phase 6-wire bridge circuit.

3. The brushless DC motor of claim 1, wherein said control system is an electronic phase-changing control system.

4. The brushless DC motor of claim 1, wherein said sensor comprises at least one Hall sensor.

* * * * *